United States Patent [19]
Hansen, III

[11] Patent Number: 5,438,730
[45] Date of Patent: Aug. 8, 1995

[54] VALVE HANDLE AND METHOD OF FASTENING SAME TO A VALVE STEM

[75] Inventor: Charles C. Hansen, III, Hinsdale, Ill.

[73] Assignee: Hansen Technologies Corporation, Burr Ridge, Ill.

[21] Appl. No.: 106,619

[22] Filed: Aug. 16, 1993

[51] Int. Cl.6 ............................................. A47B 95/02
[52] U.S. Cl. ................................................. 16/114 R
[58] Field of Search ............ 16/114 R, 121, DIG. 24, 16/DIG. 30, DIG. 40, DIG. 41; 74/543, 544, 545, 548, 553; 403/259, 319, 320, 354, 355, 378, 379; 292/350, 336.3, 347, DIG. 2, 357, 358

[56] References Cited

U.S. PATENT DOCUMENTS

| | | | |
|---|---|---|---|
| 72,597 | 12/1867 | Bristol | 292/350 |
| 367,513 | 8/1887 | Glenn | 74/543 |
| 1,878,569 | 9/1932 | Zolleis | 74/548 |
| 2,108,331 | 2/1938 | Graves | 403/378 |
| 2,635,482 | 4/1953 | Hehemann | 74/553 |
| 2,636,756 | 4/1953 | Kass | 403/355 |
| 3,167,338 | 1/1965 | Troike | 403/354 |
| 3,186,713 | 6/1965 | Hebble | 473/123 |
| 3,534,640 | 5/1968 | Macy | 408/326 |
| 3,593,560 | 7/1971 | Neuschotz | 72/374 |
| 4,289,339 | 9/1981 | Hansen | 403/378 |
| 4,479,736 | 10/1984 | Evans et al. | 16/114 R |
| 4,974,988 | 12/1990 | Svensson | 403/259 |

*Primary Examiner*—Mark Rosenbaum
*Assistant Examiner*—Chuck Y. Mah
*Attorney, Agent, or Firm*—Patnaude, Videbeck & Marsh

[57] ABSTRACT

A handle for a valve stem having a polygon shaped cross section has a transverse hole for receiving the polygon cross section portion of the stem. A second hole having an axis perpendicular to the transverse hole intersects a portion of the transverse hole which is adapted to receive one of the corners of the polygon shaped valve stem. A removable pin is thereafter forced into the second hole to deform a portion of the valve stem and retain the handle on the stem.

1 Claim, 1 Drawing Sheet

VALVE HANDLE AND METHOD OF FASTENING SAME TO A VALVE STEM

The present invention relates to handles for manually operated valves, and in particular to a new and improved means for retaining the handle upon a square valve stem.

BACKGROUND OF THE INVENTION

It is desirable to provide an inexpensive handle for a valve which will be securely attached to the stem of a valve for opening and closing same and which can be readily replaced by service personnel in the field. Existing handles frequently require threaded fasteners to retain the handle to the stem, and the machining of threads and the like increase the costs of the handle. It is desirable to provide an inexpensive handle which can be firmly attached to a square shaped stem and is manufactured with a minimum of cost.

BRIEF DESCRIPTION OF THE INVENTION

Briefly, the present invention is embodied in a handle which is attachable to the distal end of a square valve stem. The handle has a longitudinally shaped body with a transverse hole having a cross-sectional shape complementary to that of the distal end of the valve stem such that the valve stem will be slidably received within the transverse hole of the body. The body has a second hole, the principal axis of which is in a plane perpendicular to the principal axis of the transverse hole and the second hole intersects with the transverse hole such that a pin fitted in to the second hole will intersect with one of the corners of the standard square valve stem fitted therein. The handle is assembled by fitting it over the valve stem with the distal end of the stem extending through the transverse hole of the handle. A split pin made of a spring steel and having a diameter larger than the diameter of the second hole is force fitted into the second hole and during insertion shears a portion of one corner of the valve stem to thereby retain the handle on the valve stem.

GENERAL DESCRIPTION OF THE DRAWINGS

Further objects and advantages and a better understanding of the present invention will be had by referring to the following detailed description taken in conjunction with the accompanying drawings wherein.

DETAILED DESCRIPTION OF A PREFERRED EMBODIMENT

Figure 2:
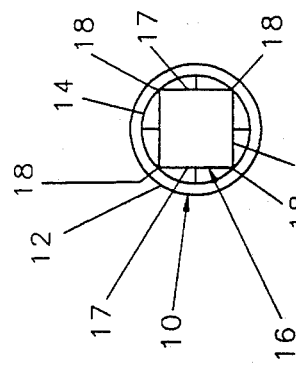
FIG. 2 is an end view of the valve stem shown in FIG. 1.
Figure 1:
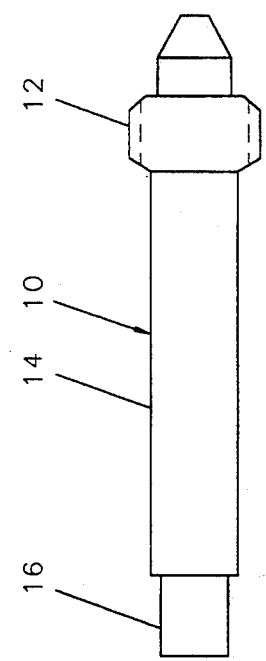
FIG. 1 is a side elevational view of a valve stem.

Referring to FIGS. 1 and 2, a valve stem 10 has a lower end 12 which is adapted to be fitted into a valve, not shown, such that rotation of the stem operates the valve. The valve stem 10 further has a central shaft 14 and at the distal end 16 thereof, a polygon shaped cross section as best shown in FIG. 2. In FIG. 2 the distal end 16 of the valve stem 10 is depicted as having a generally square shaped cross section with four flats 17—17 and four edges 18—18, one edge 18 located at the intersection between each pair of adjacent flats 17—17.

Figure 3:
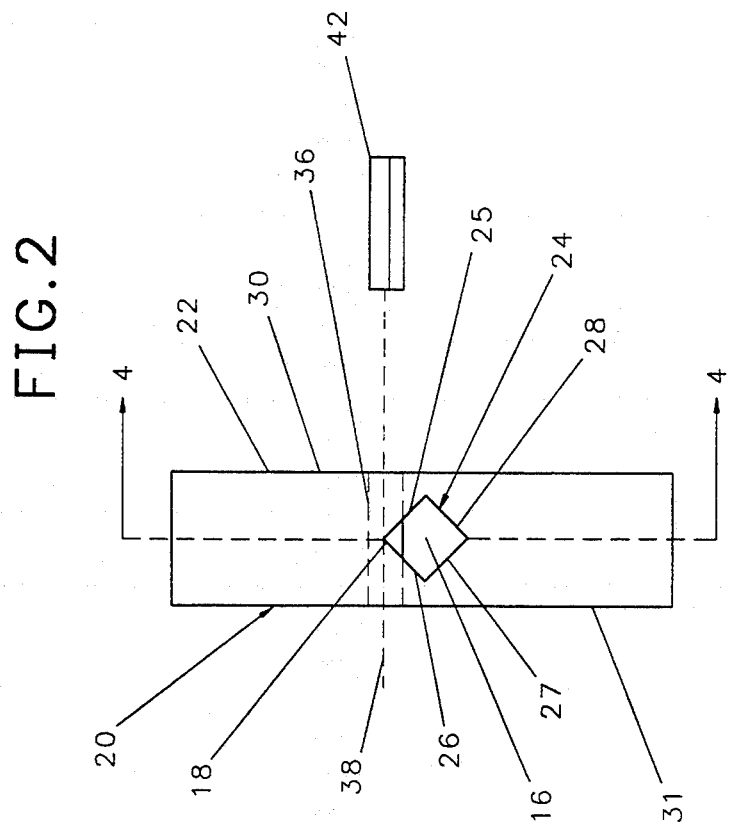
FIG. 3 is an end view of a handle constructed in accordance with the present invention with portions thereof shown in dotted line, and into which the valve stem in FIG. 1 has been fitted.
Figure 4:
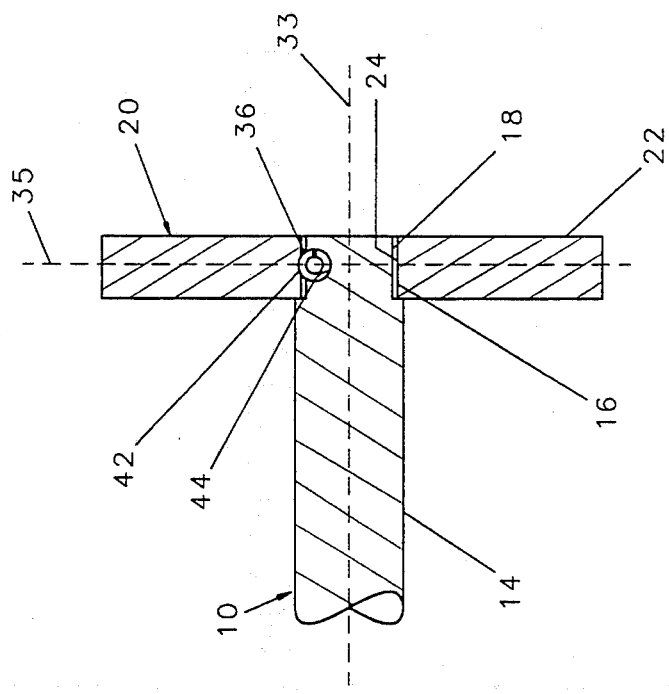
FIG. 4 is a fragmentary cross-sectional view taken along line 4—4 of FIG. 3 of the handle and valve stem fitted therein.

Referring to FIGS. 3 and 4, a handle 20 constructed in accordance with the present invention has a longitudinal body 22 and is made from a common metal bar stock of aluminum or the like, cut to any suitable length. The width of the bar stock, aluminum or the like and, therefore, of the body 22 must be sufficiently wide to receive a transverse hole 24 therein which has a cross sectional shape and size to slidably receive the distal end 16 of the valve stem 10. As can be seen in FIG. 3, the square shaped transverse hole 24 is oriented in the body 22 of the handle 29 with the sides 25, 26, 27, 28 thereof all at 45 degree angles with the sides 30, 31 of the body 22. Furthermore, the principal axis 33 of the transverse hole 24 is perpendicular to the longitudinal axis 35 of the body 22.

The body 22 of the handle 20 also has a second hole 36 which is drilled generally perpendicularly through the sides 30, 31 thereof, and has an axis 38 which is skewed perpendicular to the principal longitudinal axis 33 of the transverse hole 24. Also, the second hole 36 is positioned within the body 22 such that a portion of the hole 36 opens onto or intersects with a portion of two adjacent sides 25, 26 of the transverse hole 24.

When the handle 20 is fitted on the valve stem 10, the square shaped distal end 16 of the valve stem 10 fits within the complementary shaped transverse hole 24. The distal end of the valve stem 16 substantially occupies the entire volume of the hole 24 and occupies a portion of the cylindrical space defined by an extension of the wall of the second hole 36 through the transverse hole 24.

A cylindrical pin 42, preferably hollow, made of a spring steel and split along its length has an outer diameter substantially equal to the inner diameter of the second hole 36 is fitted into the second hole 36. The pin 42 fits slidably within the hole 36 until the end of the pin 42 contacts an edge 18 of the square shaped distal end 16 of the valve stem 10 which is fitted against the adjacent sides 25, 26 of the hole 24. In accordance with the present invention, the pin 42 is thereafter forced further into the hole 36 such that a portion of the edge 18 of the valve stem which is fitted against the sides 25, 26 is broken off or becomes deformed. As can be seen in FIG. 4, after a portion of the edge 18 of the valve stem 10 has become broken or deformed, a groove or indentation 44 is created on a portion of the edge 18 of the valve stem 10.

The pin 42 is inserted sufficiently into the second hole 36 and a portion of the pin 42 is fitted within the groove 44 formed by the removal of a portion of one of the corners 18 retaining the handle 20 on the valve stem 10.

Should it become necessary at any time to remove the handle 20 from a valve stem 10, it can be accomplished by driving the pin 42 completely through the second hole 36, using a punch. After the valve has been serviced, the handle 22 may be repositioned over the distal end 16 of the stem 10 and the pin 42 reinserted into the second hole 36. If, after repeated insertions, the deformed groove 44 of the valve stem 10 has become too enlarged for that the pin 42 to be tightly fitted through the original groove 44, the handle may be positioned on the valve stem with a differing edge 18 of the valve stem 10 fitted against sides 25 and 26 of the transverse hole 24. Thereafter, the pin 42 is reinserted and intersects with a previously undamaged edge 18 of the valve stem 10, and can be forced by any appropriate method into the hole 36 until the handle 20 is tightly secured to the valve stem 10, as has been previously described.

While the present invention has been described in connection with a particular embodiment, it will be appreciated by those skilled in the art that many changes may be made without departing from the true spirit and scope of the present invention. Therefore, it is intended by the appended claims to cover all such changes and modifications which come within the true spirit and scope of this invention.

What is claimed:

1. A method of attaching a handle to a valve stem having a distal end with a polygon shape cross section and having a plurality of edges comprising the steps of:

providing a handle with a first transverse aperture having a polygon shape including a plurality of flats and a plurality of edges at the joinder of respective pairs of said flats, complementary to a polygon defining a distal end of a valve stem for slidably receiving same therein, said transverse aperture having a principal axis, forming a second aperture through said handle, said second hole having an axis in a plane substantially perpendicular to said principal axis and said second aperture opening upon a portion of said transverse aperture defining an edge at a joinder of a pair of said plurality of flats, fitting said handle over a valve stem with a polygon shaped distal end fitted into said transverse aperture, and inserting a pin in said second aperture and with sufficient force to deform a portion of said one of said edges of said polygon shape distal end of said valve stem for retaining said handle on said stem.

* * * * *